United States Patent
Vaid et al.

(10) Patent No.: US 6,598,154 B1
(45) Date of Patent: Jul. 22, 2003

(54) PRECODING BRANCH INSTRUCTIONS TO REDUCE BRANCH-PENALTY IN PIPELINED PROCESSORS

(75) Inventors: Kushagra Vaid, Sunnyvale, CA (US); Frederick R. Gruner, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/223,079

(22) Filed: Dec. 29, 1998

(51) Int. Cl.[7] .................................................. G06F 9/38
(52) U.S. Cl. ........................ 712/237; 712/210; 712/213
(58) Field of Search ............................... 712/233–235, 712/237–240

(56) References Cited

U.S. PATENT DOCUMENTS

| | | | |
|---|---|---|---|
| 5,381,532 A | * 1/1995 | Suzuki | 712/237 |
| 5,513,330 A | * 4/1996 | Stiles | 712/204 |
| 5,542,109 A | * 7/1996 | Blomgren et al. | 712/234 |
| 5,752,069 A | * 5/1998 | Roberts et al. | 712/23 |
| 5,931,944 A | * 8/1999 | Ginosar et al. | 712/239 |
| 5,948,100 A | * 9/1999 | Hsu et al. | 712/238 |
| 6,081,884 A | * 6/2000 | Miller | 712/204 |

* cited by examiner

*Primary Examiner*—Richard L. Ellis
*Assistant Examiner*—Gautam R. Patel
(74) *Attorney, Agent, or Firm*—Schwegman, Lundberg, Woessner & Kluth, P.A.

(57) ABSTRACT

A method of reducing the branch penalty in a microprocessor includes predecoding the instruction to determine whether an instruction is a branch, the length of the instruction, and prediction marker information for the instruction should it be a branch. The target of the branch is relayed to the align stage of the microprocessor to readjust the read pointer to point to the target of the branch if the instruction is a branch. An apparatus for reducing the branch penalty in a microprocessor includes a branch predecode and taken resolution unit which determines whether an instruction is a predicted taken branch, and relays that information to the align stage of the microprocessor to deliver the target of the branch to the align stage as early as possible.

30 Claims, 4 Drawing Sheets

PRECODING BRANCH INSTRUCTIONS TO REDUCE BRANCH-PENALTY IN PIPELINED PROCESSORS

FIELD

The present invention relates generally to processors and microprocessors, and more specifically to instruction level operations of pipelined or superpipelined microprocessors.

BACKGROUND

Pipelined and superpipelined computer architectures provide broad advantages of increases in instruction throughput by overlapping the execution of multiple instructions, utilizing more of the processor at one time than traditional non-pipelined architectures. Where non-pipelined architectures execute all instructions serially, with the beginning of the next instruction following the completion of the previous instruction, pipelined architectures process instructions with varying degrees of parallel type processing. Pipelined architectures are well known in the art, and the benefits, advantages, and general structure of such architectures will not be described further herein.

Today's processors, such as the Pentium® line of processors available from Intel Corp., use a pipelined or superpipelined architecture. As the size of components used in computer processors has decreased, and the speed of computing processors has increased, architecture level operations and structures of processors have become more and more important.

Pipelined architectures are subject to certain hazards due to the dynamic nature of pipeline structures and techniques. These hazards include structural hazards arising when the processor hardware cannot support all the combinations of instructions in the pipeline structure, data hazards arising when an instruction depends on the results of a yet to be executed instruction, and control hazards arising from branches and other instructions that change the program counter.

In pipelined and superpipelined architectures, a large and costly potential control hazard is a branch hazard or branch penalty. A branch is a machine instruction that, when taken, switches the central processing unit (CPU) to another location in the program (in memory). The instruction following a non-branch instruction or a non-taken branch will be the next sequential instruction down the pipeline. If the instruction is a taken branch, however, the target of the branch may not be the next sequential instruction. When an instruction constitutes a branch, the target of that branch must be ascertained to effectively continue with execution of the instruction.

Branch prediction schemes, or branch target predictors, may be used to help ascertain the target of a branch. A mispredicted branch may cause a penalty of multiple clock cycles due to flushing the pipeline, refetching, and restarting an instruction. Superpipelined architectures can have branch penalties of six or seven clock cycles, which if encountered often can effectively eliminate the benefits of pipelining. The deeper the pipeline, the worse the potential branch penalty. In CPU instruction execution, branch prediction entails predicting the outcome of a branch so that the target instructions may be executed in parallel with the current instructions. The target of a branch instruction in a typical architecture is not known at the time the branch is encountered. The target of the branch is only decoded later down the pipeline.

In order to more effectively predict whether a branch will be taken or not taken, numerous schemes for prediction have been implemented. Some such schemes for resolving a branch instruction include predicting that the branch is always taken or always not taken. These types of schemes are known as static prediction schemes or static predictors. The rigid nature of static prediction schemes does not account for changing conditions in the execution environment. For example, a prediction that a branch is not taken leads to fetching and decoding of instructions sequentially following the branch instruction. If the branch is not taken, this scheme works well with no delay. If, however, the branch is taken, then the instructions being fetched and decoded must be discarded. The determination of whether a branch is taken may not be made for several stages down the pipeline.

Another type of branch prediction scheme is a dynamic predictive model which may be implemented using a branch target buffer (BTB), a branch prediction buffer, a branch history table, or the like. A BTB keeps a history for the execution of branches, and uses the history to predict the behavior of the branch with high accuracy. The BTB sends prediction information to the fetch module to process. Whenever the BTB finds a branch predicted to be taken, it directs the fetch unit to fetch the target of the branch. If the branch target prediction is correct, the potential branch penalty is eliminated. Further detail about prediction configurations for a BTB will not be discussed herein.

In decoding instructions in a processor, delay is to be avoided when at all possible. Any delay in the interpretation or execution of an instruction can lead to later delays in processor speed, efficiency, and operation. Branch penalties pose a significant potential time savings opportunity in a processor. An increase in branch prediction accuracy from 95% to 97% could lead to an overall speed increase in the processor of 20%.

The align stage of a processor determines where in a fetched set of data the instruction to be executed begins and ends. A pointer in the align stage is adjusted to point to the next instruction to be executed in the processor. An instruction in a computer architecture scheme is traditionally decoded further down the pipeline than in the align stage. When the instruction is a branch or potential branch, it is important to know as soon as possible the details concerning the branch. Specifically, the target of the branch is very important. The sooner the target of the branch is known, the sooner the target can be fetched.

SUMMARY

For one embodiment, a method for reducing the branch penalty in a microprocessor includes detecting whether an instruction is a branch, and predecoding the detected branch instruction to determine if the branch is predicted to be taken.

For one embodiment, the target of the branch is delivered to the microprocessor length stage if the branch is predicted taken by the branch target predictor. If the branch is predicted not to be taken, instruction flow continues sequentially with the next instruction.

For another embodiment, an apparatus for reducing branch penalty in a microprocessor includes a branch predecode module for determining whether a branch is predicted taken, and an align stage in data communication relation with the branch predecode module and receiving information indicating whether the branch is predicted taken therefrom.

DETAILED DESCRIPTION

Figure 1:
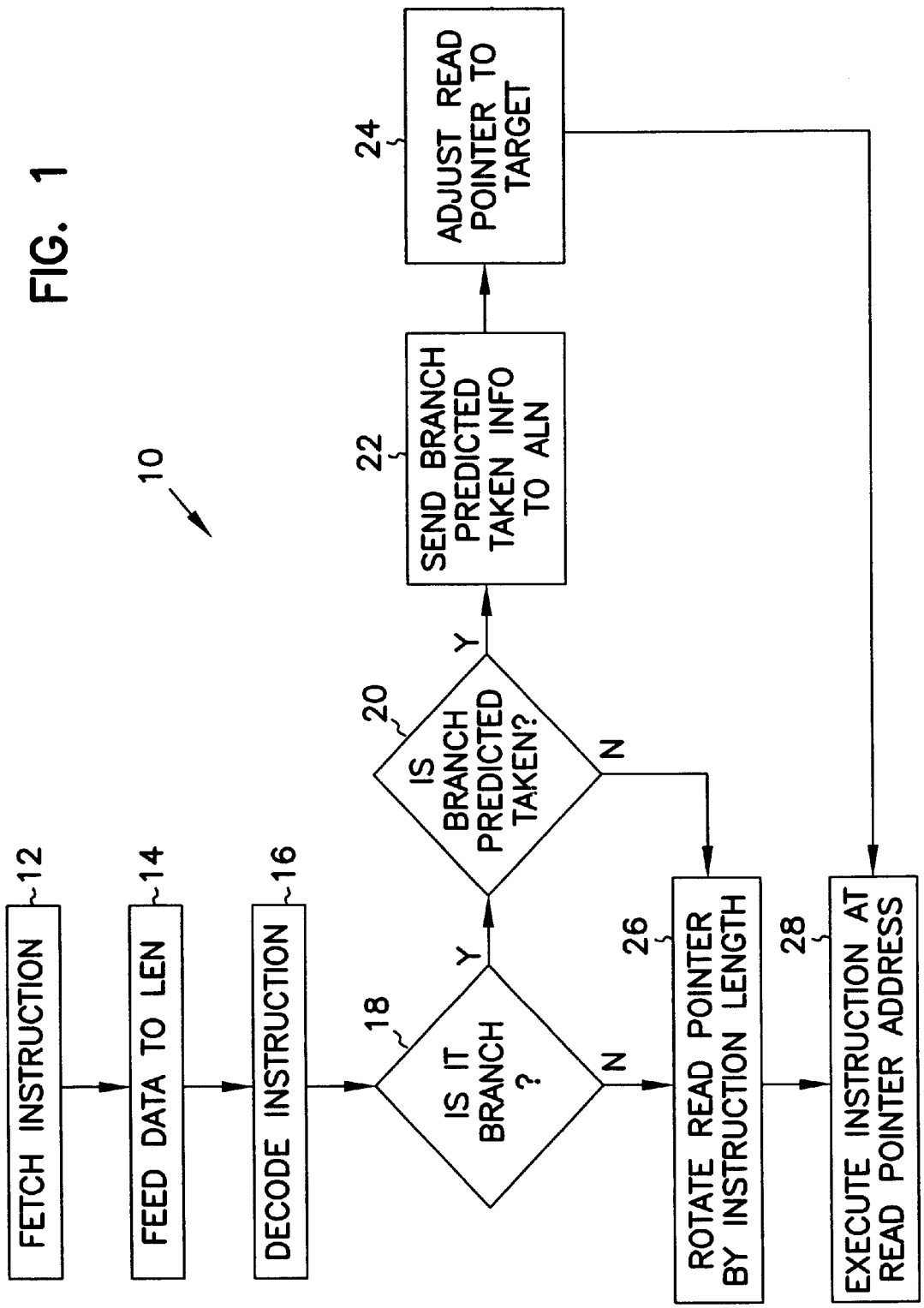
FIG. 1 is a flow chart diagram of a method embodying the invention.

In the following detailed description of sample embodiments, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and logical, structural, electrical, and other changes may be made without departing from the scope of the present invention.

At the front end of a pipelined processor having a two-stage align-decode mechanism are the aligment or align (ALN) and length (LEN) or decode stages. The ALN stage includes one or more buffers for holding fetched information, and is in communication with a fetch unit for fetching instructions from memory or cache. The ALN stage precedes the LEN stage where instructions are initially decoded. In the align stage, one or more instructions are fetched from memory or cache. The align stage determines where the next instruction begins and ends. Instruction data is fetched from the cache and stored in a buffer, or in one of a plurality of buffers. The order of the data must be known for it to make any sense to the processor. Decoding of the data will be required to determine the address of the next instruction, for example, in the buffer as the next sequential instruction, or required to be fetched from memory or cache if the current instruction is a taken branch. The length or decode stage is the first stage of the pipeline at which instructions may be decoded to determine where the end of the instruction is.

In a situation where an instruction is not a branch, the next instruction is simply sequential and will follow the previous instruction. If the instruction is a branch, however, the next instruction address location may not begin at the next sequential byte of data. If a branch is encountered, and the branch is predicted taken, so that the next instruction to be executed is the target of the branch, the branch is considered to be taken. The target of the branch will most likely not be the next sequential instruction down the pipeline. If the branch is predicted to not be taken, and the next instruction will follow sequentially down the pipeline.

If a branch is encountered, and the branch is predicted taken, the branch will have a target, and the location of this target should be provided to the align stage as early as possible, to allow the target of the branch to be fetched, thereby avoiding potential delays or penalties associated with the branch. In normal operation, a cache fetch is performed to bring each new data or instruction set into a buffer or buffers. For one embodiment, ten lines of data are fetched, each line containing 16 bytes. The lines of data are fed to two buffers. The buffers may be rotated and addressed by a read pointer which points to the beginning of the next instruction in the buffer.

While a first set of data is being processed, a cache fetch is being performed to fetch new data from the cache. An instruction may extend between the two buffers. In this situation, a buffer rotation will be required to get the next instruction from the data. In normal operation, one instruction per clock cycle can be executed. When an instruction is executed, the read pointer is adjusted in the buffer or buffers to point to the next sequential instruction coming down the pipeline. When the instruction is a branch for which the branch is predicted taken, embodiments of the invention resteer the pointer to the branch target of the predicted taken branch to allow the target of the branch to be injected into the align stage of the pipeline with fewer clock cycle delays than previous pipeline structures.

Referring now to the figures, and especially to FIG. 1, an embodiment 10 of the invention comprises a method for predecoding a branch instruction to reduce the branch penalty in a processor having a two-stage align-decode mechanism. The method 10 comprises fetching instruction data to the align stage 12, feeding the fetched data to the decode stage 14, and decoding the instruction 16. Determination is made as to whether the instruction is a branch 18, and as to whether the branch is predicted taken, if the instruction indicates a branch 20. When a branch is encountered, the fetch unit, operating in conjunction with a branch target predictor such as a BTB, fetches the predicted target of the branch. If the branch is predicted taken by process 10, information representing a predicted taken branch is fed back to the align stage 22, and the read pointer is adjusted to point to the target of the branch in the next cycle 24. Process flow continues to execute the instruction at the new address of the read pointer 28.

The embodiment 10 of the invention places the target of the branch into the length stage of the processor after a single clock delay if the branch is predicted as taken. If there is no branch predicted in decision 18, or if the branch is predicted to not be taken in decision 20, process flow continues to adjust the read pointer by the length of the previous instruction 26, and to execute the next sequential instruction 28, with no override of the adjustment of the read pointer by the length of the instruction.

In earlier stages of the pipeline, a prediction scheme such as one of those discussed above (static predictor, dynamic predictor) is used in combination with a fetch unit to fetch the predicted target of a branch. Also, earlier in the pipeline, a portion of the instruction allowing the determination of whether the instruction is a branch is decoded. Further, whether a branch in an instruction is predicted taken or predicted not taken is also determined. For another embodiment of the invention, these two pieces of information, whether the instruction is a branch, and whether the branch is predicted taken or not taken, are coded and appended as marker bits to the instruction data.

Figure 2:
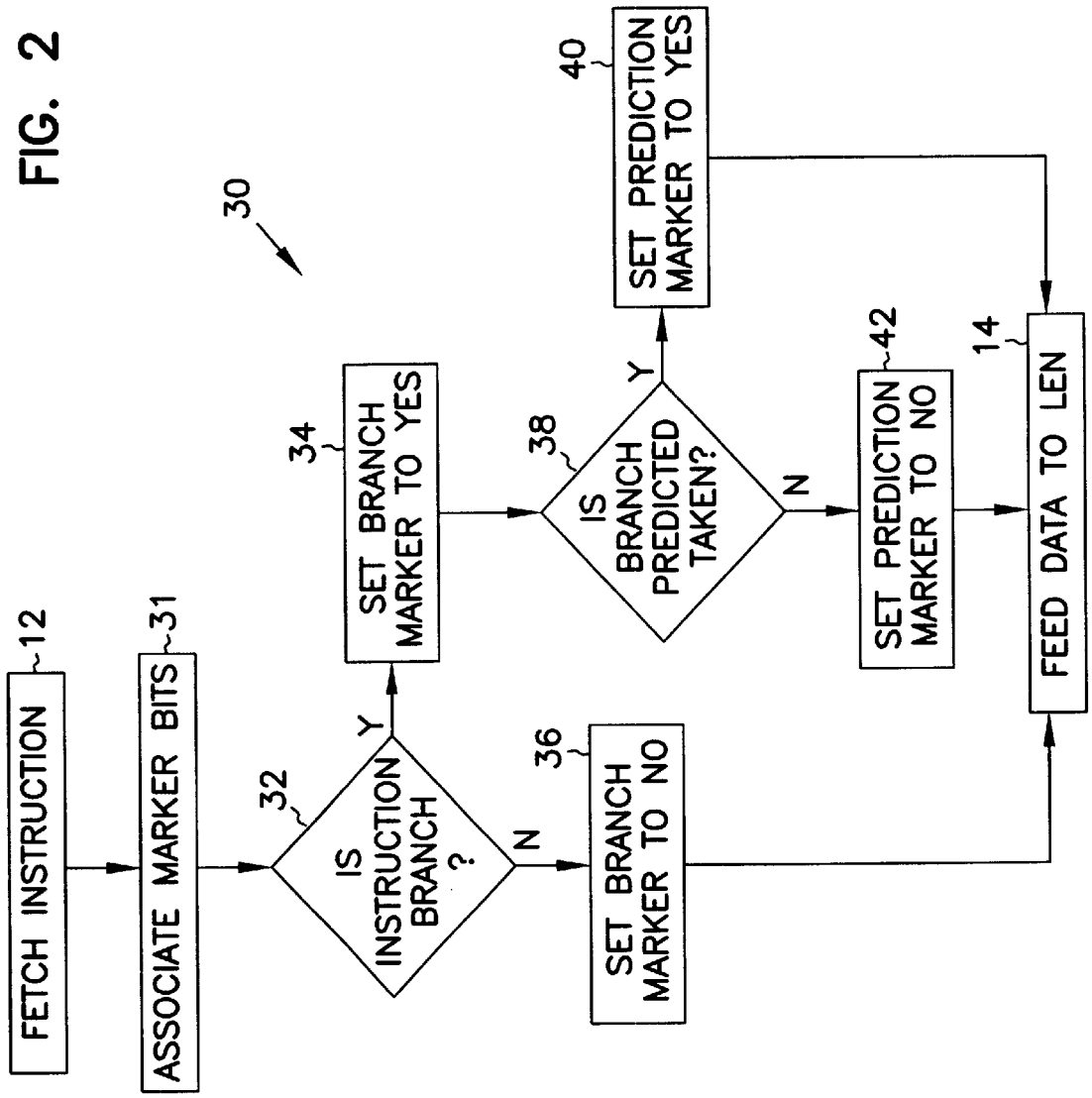
FIG. 2 is a flow chart diagram of another method embodying the invention.

An embodiment 30 of a process for associating marker bits with an instruction is shown in FIG. 2. The instruction is fetched in block 12 as in the embodiment of FIG. 1. Marker bits for branch/no branch and branch predicted taken/not taken are associated with the instruction in block 31. In decision block 32, it is determined whether the instruction is a branch. If the instruction is a branch, the branch marker bit is set to indicate a branch in block 34, and if the instruction is not a branch, the branch marker bit is set to indicate that the instruction is not a branch in block 36.

Once the branch marker has been set in block 34, process flow continues to decision block 38. In block 38, it is determined whether the branch is predicted taken or not taken. This may be done with the aid of a branch target buffer, branch target predictor, or other prediction scheme, some of which have been discussed above. If the branch is predicted taken in block 38, the branch predicted taken marker bit is set to indicate a predicted taken branch in block 40. If the branch is predicted not taken in block 38, the branch predicted not taken marker bit is set to indicate a predicted not taken branch in block 42. The instruction data with appended marker bits is sent to the LEN stage in block 14 following execution of the blocks 36, 40, or 42.

If the instruction is a branch, the BTB, other branch target predictor, or other prediction scheme has made a target prediction based on a predetermined prediction scheme which need not and will not be discussed herein. The predicted branch target is fetched by the fetch unit. If the process 10 determines that the instruction is a branch, and the branch is predicted taken, then the pointer will be adjusted to point to the fetched target of the branch. If the process determines that the instruction is not a branch, or is a branch which is predicted not taken, the pointer remains pointed at the next sequential instruction, and the next sequential instruction is executed.

The coding of the branch/no branch marker bit may be chosen for the configuration of the system, in that a branch may be indicated by either a binary one (1) or a binary zero (0) depending upon the physical components and coding of the marker. The non-branch indicator bit is the complement of the branch indicator bit. Similarly, the coding of the taken branch/not taken branch marker bit may also be chosen for the configuration of the system, in that a predicted taken branch may be indicated by either a binary one (1) or a binary zero (0) depending upon the physical components and coding of the marker. The predicted not taken branch indicator bit is the complement of the predicted taken branch marker bit.

It should be understood that the coding and coding scheme of the marker bits may be modified, as is well known in the art, so that the binary one (1) or binary zero (0) represent either of the choices of the marker bits. That is, the branch indicator bit may be either a binary one (1) or a binary zero (0), with the no branch indicator bit being a binary zero (0) or a binary one (1), respectively, and the branch predicted taken bit may be either a binary one (1) or a binary zero (0), with the branch predicted not taken bit being a binary zero (0) or a binary one (1), respectively. For purposes of this discussion, the branch indicator bit representing a branch will be a binary one (1), and the branch indicator bit representing no branch will be a binary zero (0). Also for purposes of this discussion, the branch prediction bit representing a predicted taken branch will be a binary one (1), the branch prediction bit representing a predicted not taken branch will be a binary zero (0).

The associated or appended bits, also referred to as marker bits, serve to identify or provide information about the lines of data to which they are associated. The first marker bit may be indicative of whether the branch was taken or not taken the previous time through the loop. Also, this marker bit may be generated by some more sophisticated function, process, or apparatus. In any event, the marker bit is indicative of whether the branch is predicted taken or predicted not taken.

The second marker bit is indicative of whether the instruction is a branch or not a branch. The marker bits may be associated with the instruction in any known manner, and in any order, so long as the order is known for the purposes of reading the marker bits. If the branch target buffer or other predictor predicts a branch to be taken, it directs the fetch unit to fetch the target of the branch and place the target in one of the buffers. The next parcel down the pipe is the target of the branch. It is important to know if the instruction is a branch, in order to predecode the target information as soon as possible to avoid delays. For one embodiment, the associated bits could be stored in a tag. Alternatively, a separately accessible memory or module for storage of marker bits could be implemented.

For another embodiment, the marker bits are appended to and coincide with the last byte of the instruction. The marker bits are thus positioned at the last byte of the instruction. When the length of the instruction is decoded, as is discussed later in more detail, if the marker bit position is equal to the last byte of the marker prediction, then the branch is predicted taken. In this embodiment, the marker bits are appended in the last byte of the instruction data. However, the marker bits could be positioned anywhere in the instruction, or even out of the instruction altogether, provided that appropriate reference and comparison to the marker bits is made to allow prediction of whether the branch instruction is predicted taken.

If an instruction is a branch, the sooner the target of the branch can be ascertained, the quicker the target can be relayed to the align stage to reset the pointer to the target of the branch. Branch predecode according to an embodiment of the present invention decodes a branch instruction earlier in the pipeline than conventional decoders, allowing for the target of the branch to be fed to the align stage with a minimum of delay. The logic of the embodiments of the invention disclosed herein is optimized only for branches.

Figure 3:
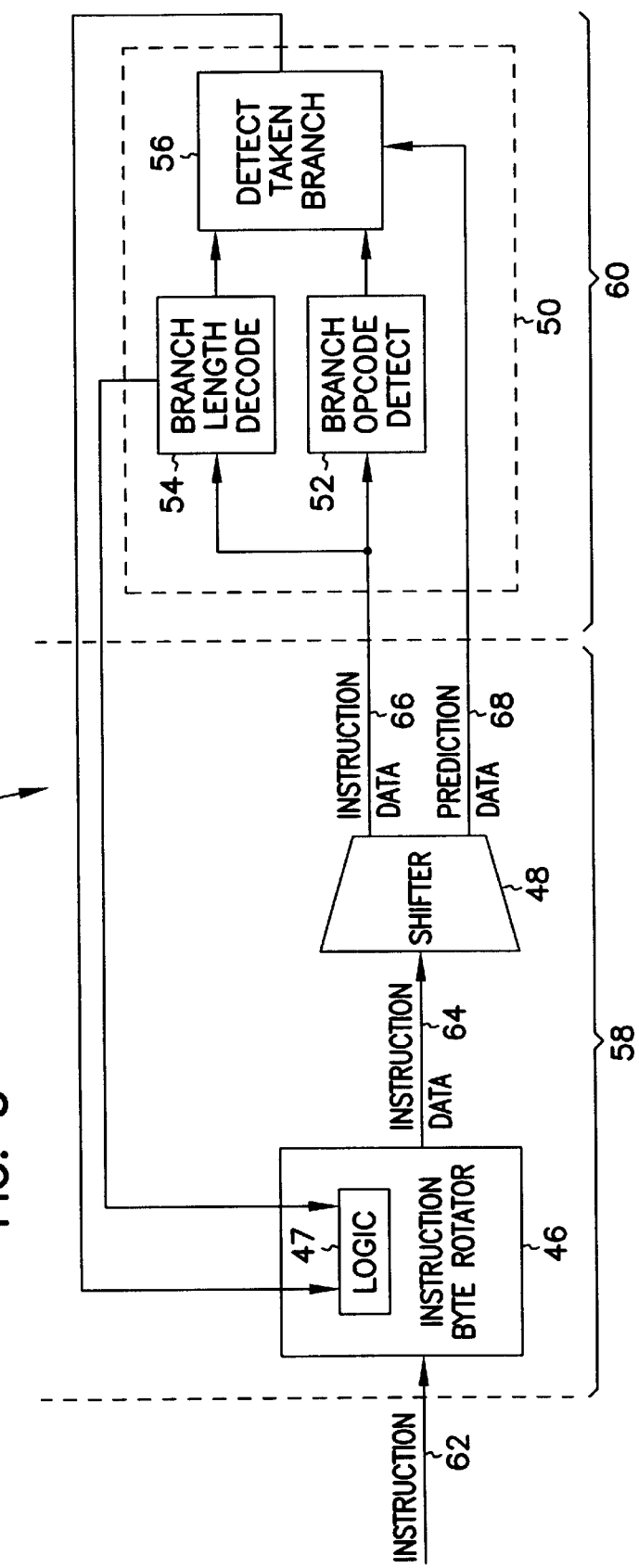
FIG. 3 is a block diagram of an apparatus embodying the invention.

Referring now to FIG. 3, an apparatus 44 for reducing the branch penalty in a microprocessor embodying the invention comprises an instruction byte rotator 46 with associated read pointer shifter and control logic 47, a shifter 48, and a branch predecode and taken resolution module 50. Branch predecode and taken resolution module 50 comprises branch opcode detect module 52, branch length decode module 54, and detect taken branch module 56. Instruction byte rotator 46 and shifter 48 are components associated with the align (ALN) stage 58 of a microprocessor, and branch predecode and taken resolution module 50 is associated with the length (LEN) stage 60 of a microprocessor.

The operation of apparatus 44 is as follows. Instruction byte rotator 46 receives an instruction fetched from memory at input 62. Shifter 48 is operatively connected to instruction byte rotator 46 to receive instruction data therefrom along line 64. Instruction data and a prediction marker containing prediction data from shifter 48 are passed to the length stage along lines 66 and 68, respectively. Line 66, carrying instruction data, connects shifter 48 to both branch opcode detect module 52 and branch length decode module 54. Line 68, carrying the prediction marker, connects shifter 48 to detect taken branch module 56.

Read pointer shifter and associated control logic 47 is used to adjust the read pointer to point to the location of the next instruction. If the instruction is not a branch, or is a branch predicted not to be taken, the control logic of the instruction byte rotator rotates the current read pointer by the number of bytes in the current instruction, redirecting the pointer to the start of the next instruction. The current pointer is rotated by the length of the instruction. The read pointer shifter and control logic 47 adjusts the read pointer to the address of the start of the next instruction by rotating the read pointer by the length of the previous instruction. If the instruction is a branch predicted taken by the process 10 or the apparatus 44, then apparatus 44 or process 10 will cause the read pointer shifter and control logic 47 to override the read pointer, and resteer the read pointer to the address of the start of the fetched branch target.

In operation, apparatus 44 functions as follows. Instruction byte rotator 46 fetches instruction data from memory. The instruction data and prediction data are presented to shifter 48, which determines, based on predefined coding, which part of the instruction is instruction data, and which part of the instruction is prediction data. The instruction data is sent to the branch opcode detect module 52 and the branch length decode module 54. Branch opcode detect module decodes enough of the instruction data to determine if the instruction is a branch. Branch length decode module 54 decodes the length of the instruction. The length of the instruction as determined by branch length decode module 54 and the indication of whether the instruction is a branch as determined by branch opcode detect module 52 are fed to detect taken branch module 56 along with the prediction marker from shifter 48. If the instruction is a branch, the branch opcode detect module 52 will so indicate to the detect taken branch module 56.

Figure 4:
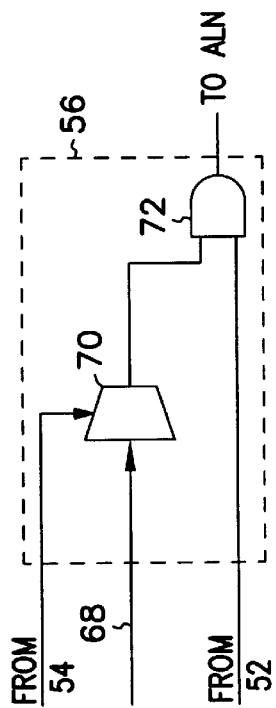
FIG. 4 is a block diagram of an embodiment of the branch predecode and taken resolution block of FIG. 3.

The detect taken branch module 56 is shown in further detail in FIG. 4. Detect taken branch module 56 comprises multiplexor 70 and logical AND gate 72. Multiplexor 70 receives as input the prediction marker on line 68 from shifter 48, and length data from the branch length decode module 54. The byte of the prediction marker corresponding to the length information supplied to the multiplexor is selected by the multiplexor, and is passed through to an input of AND gate 72. The branch/no branch marker byte from branch opcode detect module 52 is supplied to another input of AND gate 72. The two inputs are logically combined to yield a binary result which is relayed to the align stage 58.

Multiplexor 70 is used to shift the prediction marker by the decoded length of the instruction. For example, and referring to FIG. 3, an instruction is fetched from memory by instruction byte rotator 46. The instruction data and the two marker bits appended to the instruction data, as well as the prediction marker, are distributed by shifter 48 to modules 52, 54, and 56. Branch opcode detect module 52 examines the two marker bits to generate information as to whether the instruction is a branch, and sends this information in binary form to AND gate 72. The taken/not taken prediction marker from shifter 48 indicates for each potential end of the instruction whether the branch is predicted taken or not predicted taken.

Branch length decode module 54 decodes the instruction data to determine the length of the branch. The length of the instruction from branch length decode module 54 is fed to the select input of the shifter or multiplexor 70, and the prediction marker from shifter 48 is fed to the data input of shifter 70, so that shifter 70 shifts the prediction marker by the length of the instruction, selecting the prediction byte for the appropriate length of the instruction. This selected value (binary one or binary zero) is combined in AND gate 72 with the branch/no branch data from branch opcode detect module 52.

Instruction data is fed to modules or logic blocks to decode opcodes to determine if the instruction is a branch, and to decode the branch length. The branch opcode detect module 52 determines whether the instruction is a branch. The length of the instruction is decoded by length decode module 54. If the branch is predicted taken by the detect taken branch module 56, then this information is sent from the length stage 60 back to the align stage 58 for realignment of the pointer to point to the target of the branch fetched when the BTB or other prediction scheme predicts a taken branch. Detect taken branch module 56 comprises shifter 70 and AND gate 72. The detect taken branch module 56 determines if the branch is predicted taken by combining the output from shifter 70 and the branch/no branch information from branch opcode detect module 52 in AND gate 72. The binary output of AND gate 72 is a binary one (1) or a binary zero (0). A binary one (1) indicates a predicted taken branch. A binary zero (0) indicates either no branch, or a predicted not taken branch.

The output of AND gate 72 determines the next action of the apparatus 44, or of the method 10. A binary one (1) indicating a predicted taken branch causes the pointer to be adjusted to point at the fetched target of the branch. A binary zero (0) indicating no branch or a predicted not taken branch does not adjust the pointer, and the next sequential instruction is executed.

By way of example, suppose that a four bit prediction marker 0100 is produced by shifter 48. Suppose also that the branch/no branch prediction from branch opcode detect module 52 is 1, indicating a branch. If the decoded length of the instruction, as determined by branch length decode module 54, is three, the three input together with the 0100 prediction results in shifting the prediction marker by three places, selecting the third bit, 0, of the prediction. This value, 0, combined in AND gate 72 with the branch/no branch prediction of 1, produces a 0 output from AND gate 72, indicating a non-taken branch. No shifting of the pointer pointing to the next instruction address to be executed will take place. The next instruction executed by the processor will be the next sequential instruction down the pipeline.

If the decoded length of the instruction, given the same four bit prediction and the same branch/no branch prediction, is two, the two input together with the 0100 prediction results in shifting the prediction marker by two places, selecting the second bit, 1, of the prediction. This value, 1, combined in AND gate 72 with the branch/no branch prediction of 1, produces a 1 output from AND gate 72, indicating a taken branch. The pointer pointing to the next instruction address will be adjusted to point to the fetched target of the branch. The next instruction executed by the processor will be the fetched target of the branch.

Figure 5:
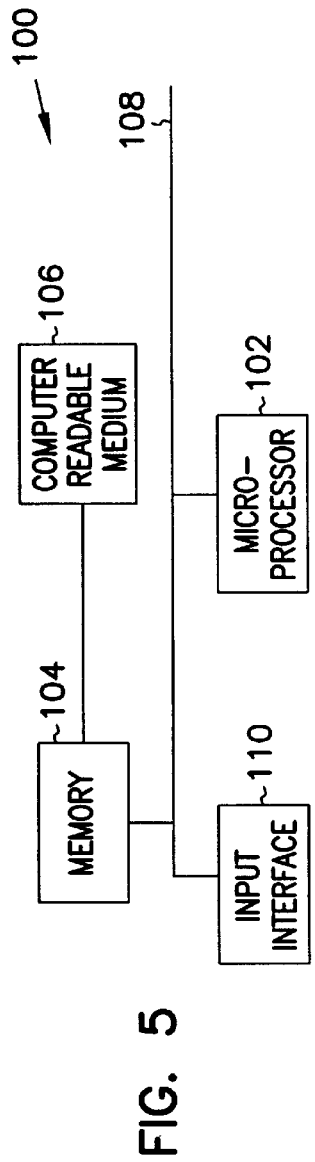
FIG. 5 is a block diagram of a computer system in which the apparatus of FIG. 3 may be implemented.

FIG. 5 shows a block diagram of computer 100 having a parallel pipeline microprocessor 102, coupled to a memory 104 and to a computer-readable medium 106 through a system bus 108. While only one microprocessor is illustrated in FIG. 5, the computer 100 can also be configured with two or more microprocessors as is well-known in the art. One of skill in the art will readily recognize that memory 102 can be read-only memory (ROM) or random access memory (RAM), and the like, or a combination of memory types. Similarly, one of skill in the art will immediately comprehend that the computer-readable medium 106 can be any type of electronic medium or combination of media including a floppy disk, hard disk, CD-ROM, or the like. The computer-readable medium 106 also equally characterizes electronic signals transmitted through a physical or wireless network to the computer 100. The memory 104 and the computer-readable memory are used to store instructions and data for processing by the microprocessor 102. The processing of instructions and data by the microprocessor is controlled by program logic which can originate in hardware, firmware, or software. Data input is accomplished with input interface 110 such as a keyboard, mouse, touchpad, or combination thereof.

Figure 6:
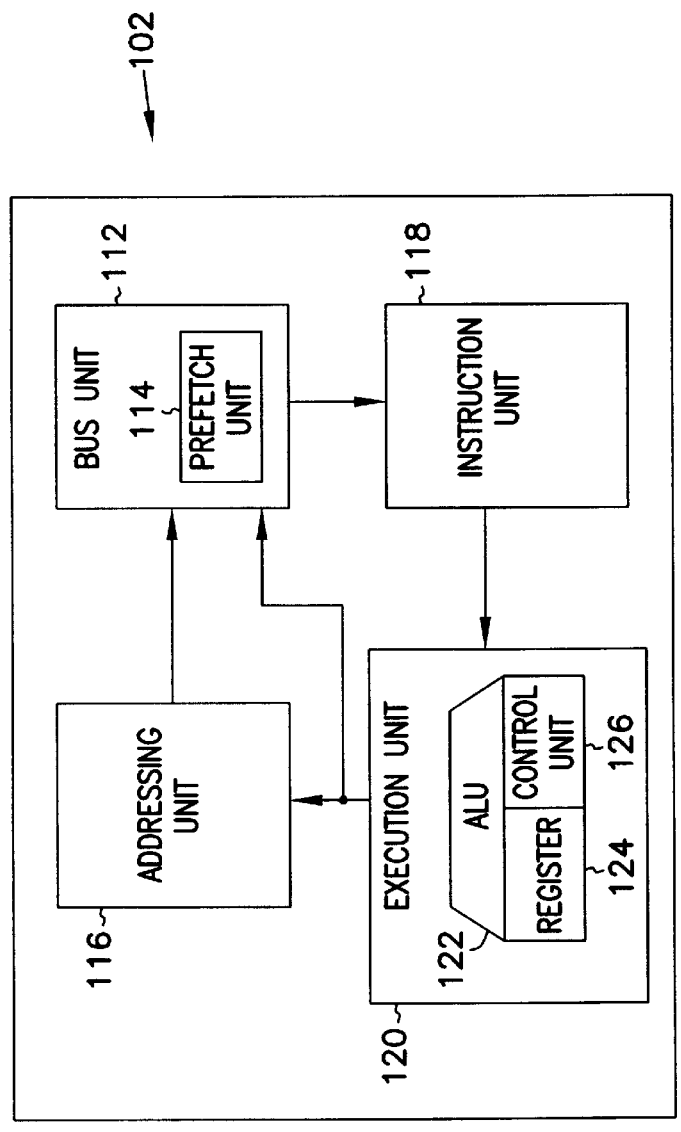
FIG. 6 is a block diagram of a microprocessor in which the apparatus of FIG. 3 may be implemented.

By way of example only, a processor 102 of the type in which embodiments of the invention could be implemented, as shown in FIG. 6, includes bus unit 112 including prefetch unit 114, addressing unit 116, instruction unit 118, and execution unit 120 which includes an arithmetic logic unit (ALU) 122, registers 124, and control unit 126. It should be understood that different processors having different structures could also support embodiments of the invention, and there is no intention to limit the application of the embodiments of the invention to a specific processor.

The methods of the present invention can be implemented in a machine readable medium comprising machine readable instructions for causing a computer to perform the method. Such machine readable medium may include software modules and computer programs. The computer programs comprise multiple modules or objects to perform the methods 10 or 28, or the functions of the apparatus 44 or the modules in apparatus 44. The type of computer programming languages used to write the code may vary between procedural code type languages to object oriented languages. The files or objects need not have a one to one correspondence to the modules or method steps described depending on the desires of the programmer. Further, the method and apparatus may comprise combinations of software, hardware and firmware as is well known to those skilled in the art.

CONCLUSION

In a pipelined or superpipelined processor operating with an align and a decode stage, for an instruction which is a branch, the embodiments of the invention. provide a mechanism to inject the target of the branch into the pipeline as soon as possible to minimize performance loss. On detection of a branch instruction, the target of the branch is predicted through use of a branch target buffer or other branch target prediction scheme. The embodiments of the invention determine at an early stage whether the branch is predicted taken. If the branch is predicted taken, this knowledge is relayed to the align stage with a minimum delay, allowing the target of the branch to be delivered to the length stage with reduced delay.

This is accomplished by predecoding the instruction data in the length stage, determining if the instruction is a branch, determining the branch length, and if the branch is predicted to be taken or not taken. This information is fed back to the align stage, which points the instruction pointer to the target of the branch if the branch is predicted taken, and to the next sequential instruction if the branch is predicted not taken, or if the instruction is not a branch. This is accomplished by selecting either the byte starting from the branch target (branch predicted taken) or the next sequential instruction (branch predicted not taken). If the branch is predicted taken, then this information is fed back to ALN where the buffer management logic readjusts the pointer in the buffer so that it points to the target of the branch in the next cycle. This allows for fast restarts from the branch instruction, assuming the prediction was correct. An incorrect prediction still causes clock delay.

Another embodiment of a method of the invention comprises a method of reducing the branch penalty in a processor having a branch target buffer. The method comprises predecoding instruction data fetched from cache in the length stage, determining if the predecoded instruction is a branch, determining the branch length if the instruction is a branch, determining if the branch target buffer predicted whether the branch was taken or not, providing information regarding the determinations to the align stage, selecting the bytes starting from the branch target if the branch was predicted taken, and selecting the next sequential instruction if the branch was predicted untaken.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the full scope of equivalents thereof.

What is claimed is:

1. Apparatus for reducing branch penalty in a processor, comprising:

a branch predecode module for determining whether a branch instruction is predicted taken, wherein the branch predecode module comprises a length decode module for decoding the length of the instruction;

a branch opcode detect module for decoding whether the instruction is a branch; and a detect taken branch module for determining whether the particular branch is predicted taken;

an align stage in data communication relation with the branch predecode module, and receiving information indicating whether the branch is predicted taken therefrom;

wherein the detect taken branch module comprises:

a multiplexor connected to receive information input from the align stage and from the length decode module, the multiplexor selecting the prediction byte of the prediction marker corresponding to the length of the instruction; and an AND logic module connected to receive the selected prediction marker byte from the multiplexor, and to receive information as to whether the instruction is a branch from the branch opcode detect module.

2. The apparatus of claim 1, wherein the align stage further comprises:

an instruction byte rotator for fetching an instruction and for generating a pointer to the next instruction; and a shifter connected to the instruction byte rotator, the shifter selecting and separating the instruction data and the prediction marker.

3. Apparatus for reducing branch penalty in a processor, comprising:

an instruction byte rotator for fetching an instruction having instruction data and a prediction marker having prediction bytes and for generating a pointer to a next instruction;

a shifter connected to receive data from the instruction byte rotator, the shifter separating the instruction data and the prediction marker;

a length decode module connected to receive the instruction data from the shifter, the length decode module decoding the length of the instruction;

a branch opcode detect module connected to receive the instruction data from the shifter the branch opcode detect module determining whether the instruction is a branch;

a multiplexor connected to receive the prediction marker from the shifter, and to receive decoded length data from the length decode module, the multiplexor selecting the prediction byte of the prediction marker corresponding to the length of the instruction; and an AND gate connected to the multiplexor and to the length decode module to combine the prediction byte of the instruction data and the branch information from the branch opcode detect module, the AND gate output indicating whether the branch is predicted taken or not taken, the AND gate output and the output of the length decode module connected to the instruction byte rotator to readjust the pointer to the target of the branch if the branch is predicted taken.

4. A computer system comprising:

a microprocessor having an apparatus for reducing the branch penalty therein, the apparatus comprising:

an align stage receiving instruction data from an instruction buffer to shift the instruction data to the next instruction to be executed, and to associate therewith prediction data indicated whether or not a branch instruction is to be taken, a length-decode stage receiving the instruction data and immediately following the align stage to determine the length of the next instruction and to predecode whether the next instruction is or is not a branch instruction, and, if so, to determine from the prediction data whether or not the branch is taken, and if so, to return a branch length to the immediately preceding align stage so as to shift the align stage to a target of the branch where the length-decode stage predecodes only branch instructions;

a memory for storing instructions to be processed by the microprocessor and coupled to the microprocessor through a system bus; and a computer-readable medium for storing instructions and data to be processed by the microprocessor and coupled to the microprocessor through the system bus.

5. The computer system of claim 4 wherein the length stage returns the branch length directly to the align stage.

6. The computer system of claim 4 wherein the branch-prediction data comprises bits attached to individual ones of the instructions.

7. A microprocessor comprising:

a bus unit including a prefetch unit;

an addressing unit;

an instruction unit;

an execution unit having an arithmetic logic unit, at lease one register, and a control unit; and an apparatus for reducing the branch penalty, comprising:

an align stage receiving instruction data from an instruction buffer to shift the instruction data to the next instruction to be executed, and to associate therewith prediction data indicated whether or not a branch instruction is to be taken, a length-decode stage receiving the instruction data and immediately following the align stage to determine the length of the next instruction and to predecode whether the next instruction is or is not a branch instruction, and, if so, to determine from the prediction data whether or not the branch is taken, and if so, to return a branch length to the immediately preceding align stage so as to shift the align stage to a target of the branch;

where the length stage returns the branch length directly to the align stage.

8. The microprocessor of claim 7 wherein the length stage returns the branch length directly to the align stage.

9. The microprocessor of claim 7 wherein the branch-prediction data comprises bits attached to individual ones of the instructions.

10. Apparatus for reducing branch penalty in a processor, comprising:

an align stage receiving instruction data from an instruction buffer to shift the instruction data to the next instruction to be executed, and to associate therewith prediction data indicated whether or not a branch instruction is to be taken;

a length-decode stage receiving the instruction data and immediately following the align stage to determine the length of the next instruction and to predecode whether the next instruction is or is not a branch instruction, and, if so, to determine from the prediction data whether or not the branch is taken, and if so, to return a branch length to the immediately preceding align stage so as to shift the align stage to a target of the branch;

where the length stage predecodes only branch instructions.

11. The apparatus of claim 10 where the branch length is returned to the align stage in a single clock cycle.

12. The apparatus of claim 10 where the align stage attaches the prediction data to the instruction data.

13. The apparatus of claim 10 where the length stage returns the branch length directly to the align stage.

14. The apparatus of claim 13 where the branch-prediction data comprises bits attached to individual ones of the instructions.

15. The apparatus of claim 10 where the branch-prediction data comprises bits attached to individual ones of the instructions.

16. The apparatus of claim 10 where the branch-prediction data comprises bits attached to individual ones of the instructions.

17. Apparatus for reducing branch penalty in a processor, comprising:

an align stage receiving instruction data from an instruction buffer to shift the instruction data to the next instruction to be executed, and to associate therewith prediction data indicated whether or not a branch instruction is to be taken;

a length-decode stage receiving the instruction data and immediately following the align stage to determine the length of the next instruction and to predecode whether the next instruction is or is not a branch instruction, and, if so, to determine from the prediction data whether or not the branch is taken, and if so, to return a branch length to the immediately preceding align stage so as to shift the align stage to a target of the branch;

where the length stage returns the branch length directly to the align stage.

18. The apparatus of claim 17 where the branch length is returned to the align stage in a single clock cycle.

19. The apparatus of claim 17 where the align stage attaches the prediction data to the instruction data.

20. The apparatus of claim 17 where the length stage predecodes only branch instructions.

21. The apparatus of claim 20 where the branch-prediction data comprises bits attached to individual ones of the instructions.

22. A method for reducing branch penalty in a processor, comprising:

receiving instruction data from a buffer;

shifting the instruction data to the address of a next instruction;

associating branch-prediction data with the next instruction;

immediately after the foregoing operations, predecoding the next instruction only insofar as to determine whether or not it is a branch;

determining the length of the branch;

determining from the prediction data whether or not the branch is taken, and, if so, immediately shifting the instruction data to the address of the target of the branch in accordance with the length data;

where the branch-prediction data comprises bits attached to individual ones of the instructions.

23. The method of claim 22 where the receiving, shifting, and associating operations occur in a single clock cycle of the processor.

24. The method of claim 22 where the predecoding and the two determining operations occur in a single clock cycle.

25. The method of claim 22 where all of the operations occur in two clock cycles.

26. The method of claim 22 where the length stage predecodes only branch instructions.

27. The method of claim 26 where the length stage returns the branch length directly to the align stage.

28. The method of claim 22 where the length stage returns the branch length directly to the align stage.

29. A method for reducing branch penalty in a processor, comprising:

receiving instruction data from a buffer;

shifting the instruction data to the address of a next instruction;

associating branch-prediction data with the next instruction;

immediately after the foregoing operations, predecoding the next instruction in a length stage only insofar as to determine whether or not it is a branch, where the length stage predecodes only branch instructions;

determining the length of the branch;

determining from the prediction data whether or not the branch is taken, and, if so, immediately shifting the instruction data to the address of the target of the branch in accordance with the length data.

30. The method of claim 20 where all of the operations occur in two clock cycles.

\* \* \* \* \*

UNITED STATES PATENT AND TRADEMARK OFFICE
CERTIFICATE OF CORRECTION

PATENT NO. : 6,598,154 B1
DATED : July 22, 2003
INVENTOR(S) : Kushagra Vaid and Frederick R. Gruner It is certified that error appears in the above-identified patent and that said Letters Patent is hereby corrected as shown below:

Column 11,
Line 48, delete "lease" and insert -- least -- therefor.

Column 14,
Line 25, delete "claim 20" and insert -- claim 29 -- therefor.

Signed and Sealed this

Twenty-third Day of December, 2003

JAMES E. ROGAN
*Director of the United States Patent and Trademark Office*